United States Patent
He et al.

(10) Patent No.: US 7,274,404 B1
(45) Date of Patent: Sep. 25, 2007

(54) MOTION OBJECT VIDEO ON FILM DETECTION AND ADAPTIVE DE-INTERLACE METHOD BASED ON FUZZY LOGIC

(75) Inventors: Lei He, Fremont, CA (US); Hongmin Zhang, Santa Clara, CA (US)

(73) Assignee: Pixelworks, Inc., Tualatin, OR (US)

( * ) Notice: Subject to any disclaimer, the term of this patent is extended or adjusted under 35 U.S.C. 154(b) by 580 days.

(21) Appl. No.: 10/922,070

(22) Filed: Aug. 18, 2004

Related U.S. Application Data (63) Continuation of application No. 10/053,040, filed on Jan. 18, 2002, now Pat. No. 6,799,168.

(51) Int. Cl.
*H04N 7/01* (2006.01)

(52) U.S. Cl. .................... 348/448; 348/441

(58) Field of Classification Search ............. 348/448, 348/441, 452, 459; 706/8, 1; *H04N 7/01, H04N 11/20*
See application file for complete search history.

(56) References Cited

U.S. PATENT DOCUMENTS 5,742,348 A 4/1998 Kuwahara et al.
6,285,801 B1 9/2001 Mancuso et al.
6,704,055 B1 * 3/2004 He et al. .................... 348/449
7,193,655 B2 * 3/2007 Nicolas ..................... 348/448

OTHER PUBLICATIONS

Khunkay et al. *Image Segmentation by Fuzzy Rule and Kohonen-Constraint Satisfaction Fuzzy C-Mean* International Conference on ICIS Sep. 1997; pp. 713-717.

* cited by examiner

*Primary Examiner*—Sherrie Hsia
(74) *Attorney, Agent, or Firm*—Marger Johnson & McCollom, P.C.

(57) ABSTRACT

A method and system for performing fuzzy logic based de-interlacing on film source fields that might be mixed with video on film. An embodiment of the invention comprises an adaptive de-interlacer by weighing between merge operation and interpolation operation in the case of occurring video on film motion object. A weighing factor is generated from video on film pattern based on fuzzy logic inference rules. This weighing factor specifies the weighting between merging and interpolating in assigning the pixel values of the progressive display output.

29 Claims, 8 Drawing Sheets

|       | m-1 | m | m+1 |
|-------|-----|---|-----|
| Ln-1  |     | a |     |
| Ln    |     | x |     |
| Ln+1  |     | b |     |
| Ln+2  |     | c |     |
| Ln+3  |     | d |     |

Intra[1,1] = | P(L[n+1], m) − P(L[n−1], m) |;
Intra[1,2] = | P(L[n+1], m) − P(L[n+3], m) |; and
Intra[1,3] = | P(L[n], m) − P(L[n+2], m) |.

Sum[1] = Intra[1,1] + Intra[1,2] + Intra[1,3].

Inter[1,1] = | P(L[n], m) − P(L[n−1], m) |; and
Inter[1,2] = | P(L[n], m) − P(L[n+1], m) |.

Figure 4A

Intra[2,1] = | P(L[n+1], m-1) − P(L[n−1], m+1) |;
Intra[2,2] = | P(L[n+1], m-1) − P(L[n+3], m-3) |; and
Intra[2,3] = | P(L[n], m) − P(L[n+2], m-2) |.

Sum[2] = Intra[2,1] + Intra[2,2] + Intra[2,3].

Inter[2,1] = | P(L[n], m) − P(L[n−1], m+1) |; and
Inter[2,2] = | P(L[n], m) − P(L[n+1], m-1) |.

Figure 4B

Intra[3,1] = | P(L[n+1], m+1) − P(L[n−1], m−1) |;
Intra[3,2] = | P(L[n+1], m+1) − P(L[n+3], m+3) |; and
Intra[3,3] = | P(L[n], m) − P(L[n+2], m+2) |.

Sum[3] = Intra[3,1] + Intra[3,2] + Intra[3,3].

Inter[3,1] = | P(L[n], m) − P(L[n−1], m−1) |; and
Inter[3,2] = | P(L[n], m) − P(L[n+1], m+1) |.

Figure 4C

Crisp logic rules 510 are:

---

If Sum[1] is the minimum element of {Sum[1], Sum[2], Sum[3]},

Then let R[1] = maximum element of {Intra[1,1], Intra[1,2], Intra[1,3]}, and let R[2] = minimum element of {Inter[1,1], Inter[1,2]}.

Otherwise, if Sum[2] is the minimum element of {Sum[1], Sum[2], Sum[3]},

Then let R[1] = maximum element of {Intra[2,1], Intra[2,2], Intra[2,3]}, and let R[2] = minimum element of {Inter[2,1], Inter[2,2]}.

Otherwise, if Sum[3] is the minimum element of {Sum[1], Sum[2], Sum[3]},

Then let R[1] = maximum element of {Intra[3,1], Intra[3,2], Intra[3,3]}, and let R[2] = minimum element of {Inter[3,1], Inter[3,2]}.

---

Fuzzy logic inference rules 520 are:

---

If R[1] is Small and R[2] is Large, then k is Large.

Otherwise,

If R[1] is not Small or R[2] is not Large, then k is Small.

MOTION OBJECT VIDEO ON FILM DETECTION AND ADAPTIVE DE-INTERLACE METHOD BASED ON FUZZY LOGIC

This application is a continuation of U.S. patent application Ser. No. 10/053,040, filed Jan. 18, 2002 now U.S. Pat. No. 6,799,168, and is herein incorporated by reference.

FIELD OF THE INVENTION

The present invention relates to film source de-interlacing, particularly to fuzzy logic based film source de-interlacing that is adaptive to video on film.

BACKGROUND

Most of the analog broadcasting television signals are interlaced, such as NTSC, PAL or SECAM. In the case of NTSC, 262.5 scan lines (one field) are presented every one-sixtieth of a second, which is half of each frame. The interlaced video has advantages for delivering acceptable video image without exceeding broadcasting bandwidth limitations. However, it has disadvantages of lack vertical resolution, area flicker and line flicker etc. Hence, so called line doubling or de-interlacing techniques are developed to convert interlaced television signal (NTSC, PAL or SACAM) to a non-interlaced or progressively scanned television signal.

A frame (in the case of NTSC, 525 lines) rather than a field is scanned in 60 Hz. Theoretically vertical resolution is doubled to the fill frame resolution 525 lines. Especially in the case of using inversing pull down method, progressive oriented content video source is converted back to frame image, which are in turn converted to interlaced video using 2-3 pull down or 2-2 pull down approach from 24 Hz or 25 Hz progressive film picture. Those conversions are very frequently used in the applications such as progressive televisions, television standard converters, television signal processors, and video signal compressors.

Typically, line doublers employ field merge or inter-field interpolation to recover the full frame resolution. Generally speaking, merge is used in static region of the image and inter- or intra-field interpolation are used in motion part of the picture. In so doing, however, a common problem called "jaggies" occurs. This problem is also called diagonal-edge or saw-tooth effects. Specifically, these artifacts appear on both stationary and moving diagonal edges as a jagged saw-toothed pattern.

Another serious problem happens in inverse 2-3 pull down processing, which merges the fields from originally same film frame. When the television is in PIP (picture in picture) mode, a small video overlaps on a film image. The solution for this case generally is to quit film merge operation and perform regular interpolation. But before changing over from one mode to another, the saw-tooth pattern appears on the video region.

BRIEF DESCRIPTION OF THE FIGURES

The accompanying drawings which are incorporated in and form a part of this specification, illustrate embodiments of the invention and together with the description, serve to explain the principles of the invention.

DETAILED DESCRIPTION

Reference is made in detail to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 2:
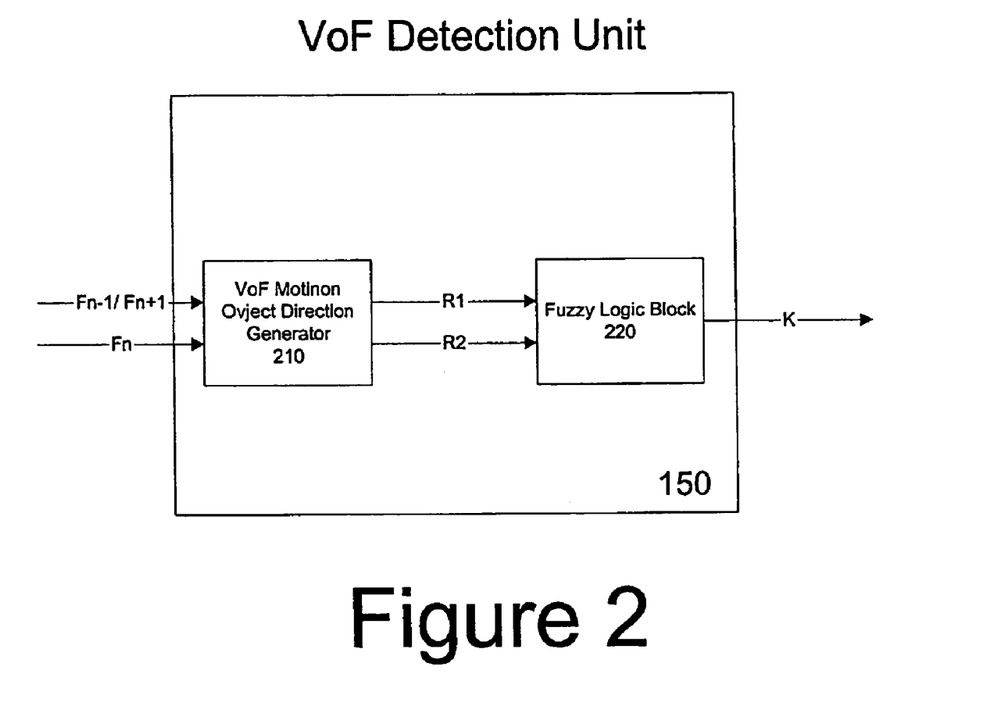
FIG. 2 shows the video on film motion object detection unit of the system shown in FIG. 1 in accordance with one embodiment of the invention.
Figure 3:
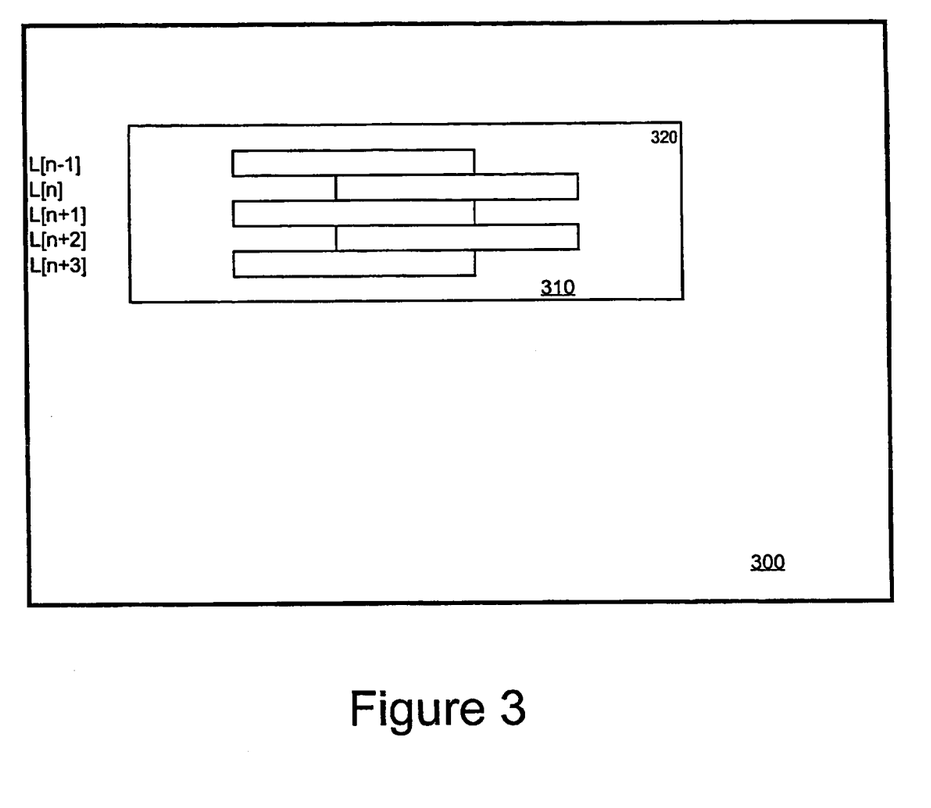
FIG. 3 shows an example (from conventional approaches) of motion object video on film that has image edge degradation resulting from incorrectly applying the de-interlacing technique of merging to video on film.
Figure 4A:
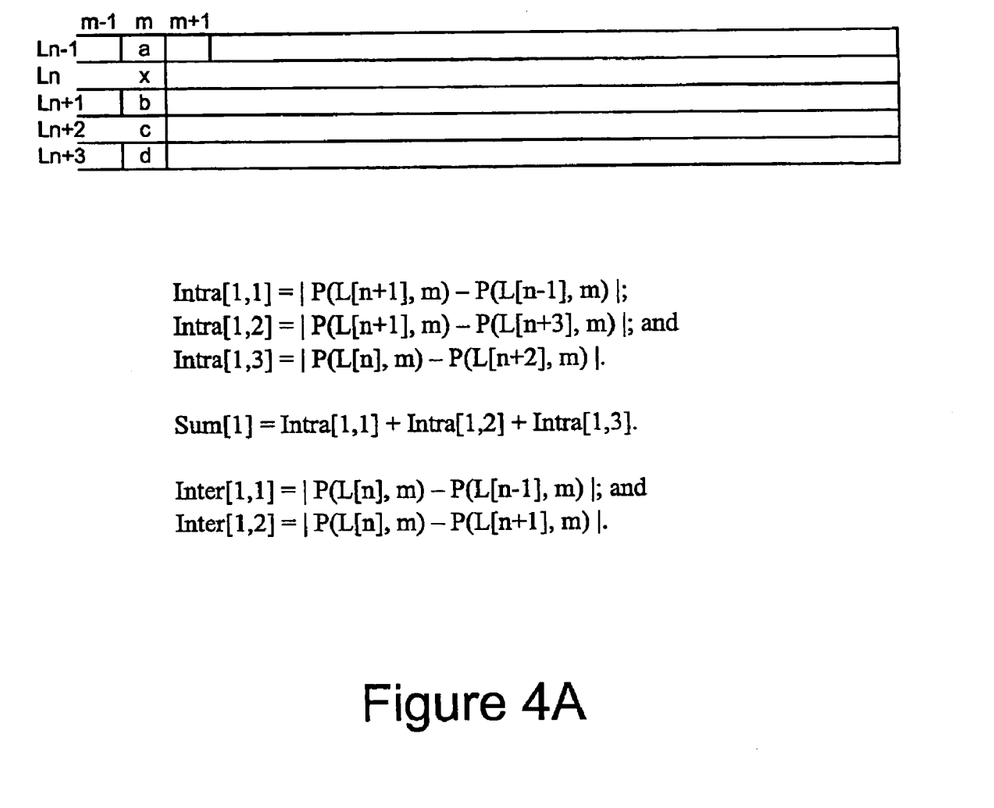
FIG. 4A shows various reference quantities associated with an example of motion object video on film having an edge in a pre-defined direction in accordance with one embodiment of the invention.
Figure 4B:
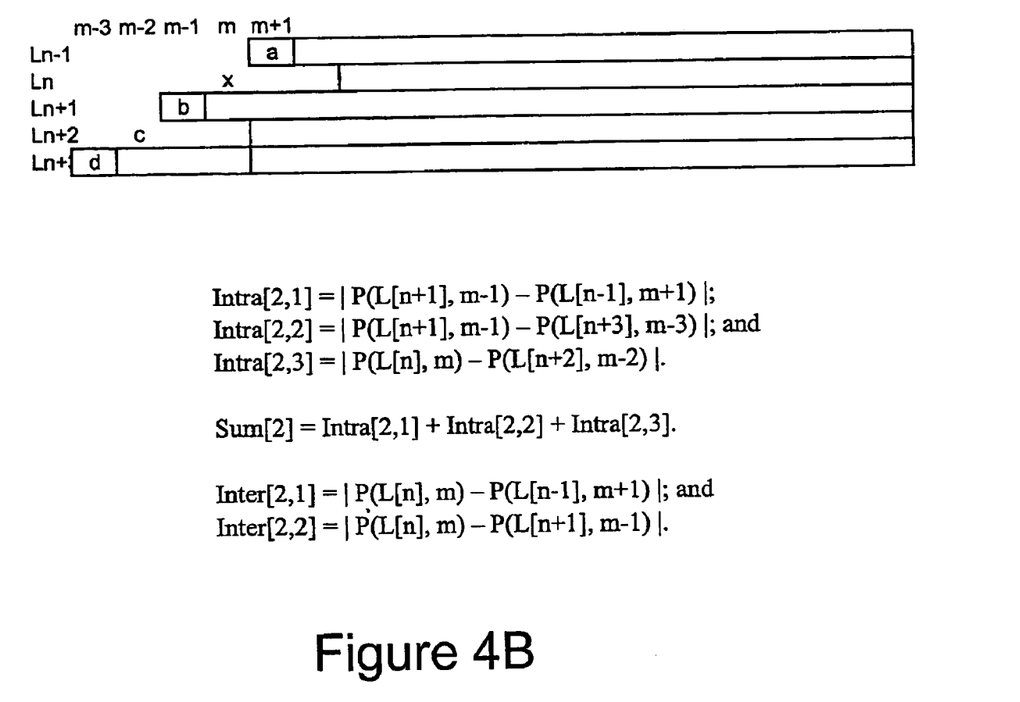
FIG. 4B shows various reference quantities associated with an example of motion object video on film having an edge in another pre-defined direction in accordance with one embodiment of the invention.
Figure 4C:
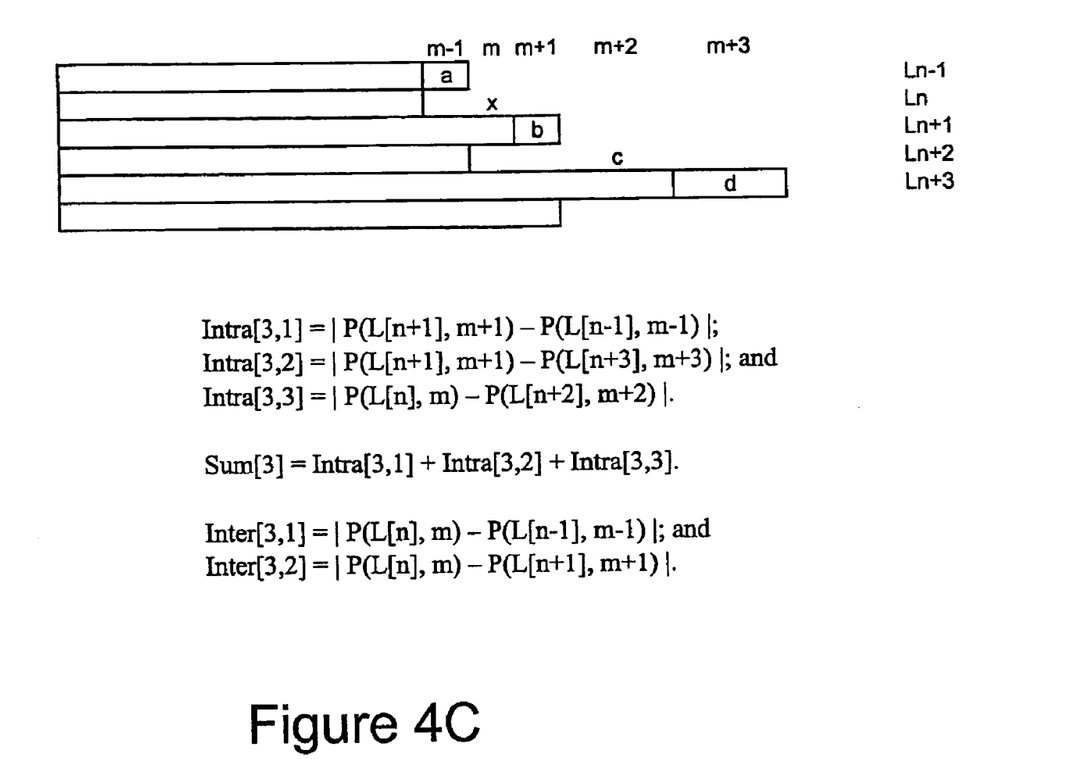
FIG. 4C shows various reference quantities associated with an example of motion object video on film having an edge in yet another pre-defined direction in accordance with one embodiment of the invention.
Figure 5:
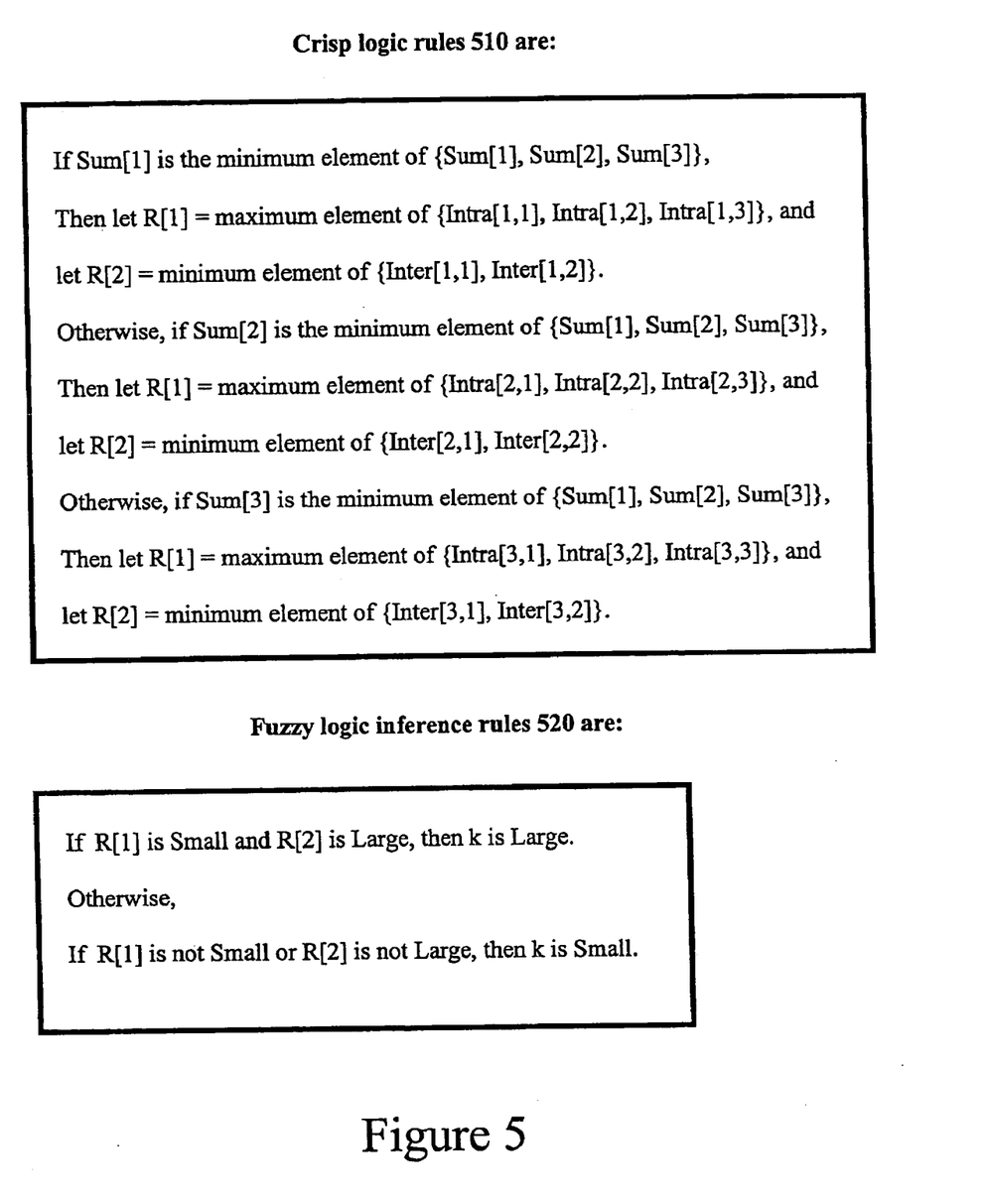
FIG. 5 summarizes a set of classical logic inference rules and a set of fuzzy logic inference rules that are applied to de-interlacing motion object video on film in accordance with one embodiment of the invention.
Figure 6:
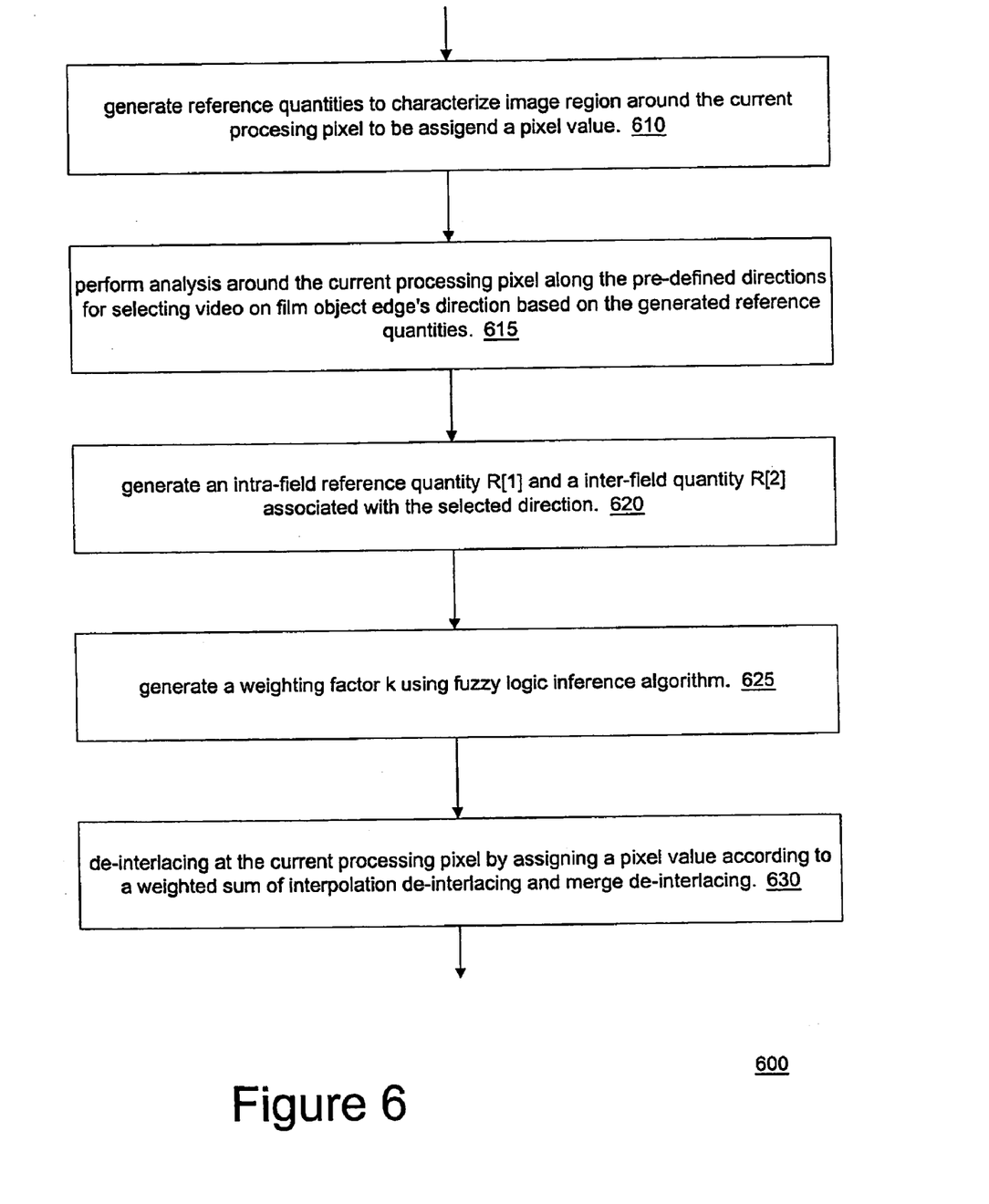
FIG. 6 is a flow chart outlining steps performed for de-interlacing in accordance with one embodiment of the invention.

First of all, an introductory summary of the detailed description is presented here. Specifically, FIG. 1 introduces a system for performing de-interlacing according to an embodiment of the invention. FIG. 2 focuses on a constituent component of the de-interlacing system introduced in FIG. 1. A part of this constituent component is adapted to carry out fuzzy logic decisions, which are adapted to indicate the desired mixture of different de-interlacing approaches to be used. FIG. 3 illustrates what can go run wrong to an image's edge when merge mode de-interlacing is performed indiscriminately to an object edge in the case of video on film. FIGS. 4A-4C show respectively three sets of reference quantities associated respectively with three pre-defined directions for a video on film object edge. FIG. 5 summarizes the crisp (classical) and fuzzy logic inference rules used in one embodiment of the invention. FIG. 6 is a flow chart outlining steps of a de-interlacing method performed according to an embodiment of the invention.

Figure 1:
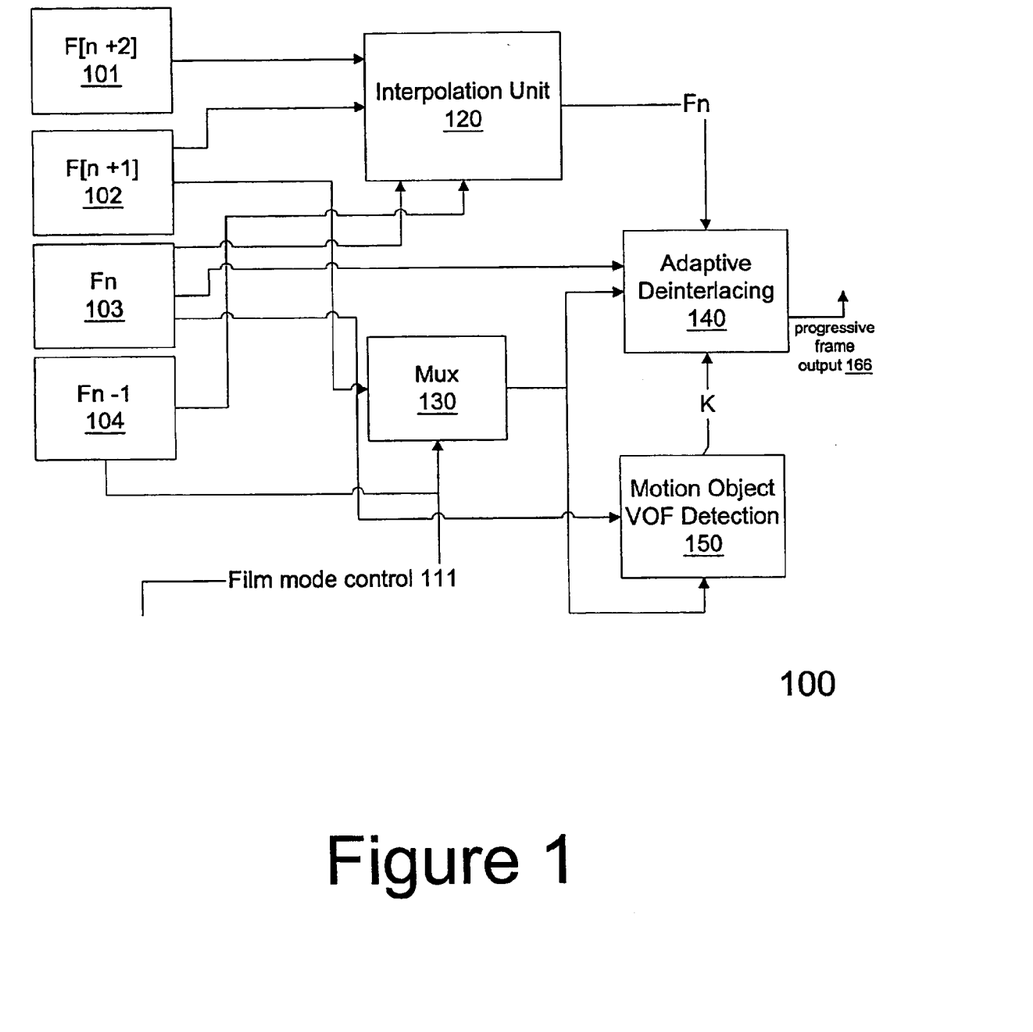
FIG. 1 shows a system for performing de-interlacing in accordance with one embodiment of the invention.

Referring now to FIG. 1, a system 100 for performing de-interlacing is shown in accordance with one embodiment of the invention.

System 100 comprises four buffers 101-104, an interpolation unit 120, a multiplexer 130, an adaptive de-interlacing unit 140 and a motion object video on film (VOF) detection unit 150.

Buffers 101-104 are coupled to various other components in system 100. Specifically, buffers 101-104 are coupled to interpolation unit 120. Buffers 102 and 104 are coupled to multiplexer 130. Buffer 103 is also coupled to both adaptive de-interlacing unit 140 and motion object VOF detection unit 150. Moreover, multiplexer 130 is coupled to adaptive de-interlacing unit 140 and motion object VOF detection unit 150. Interpolation unit 120 is coupled to adaptive de-interlacing unit 140.

Per one operation cycle of system 100, buffers 101-104 are adapted respectively to store four consecutive video fields of a video field sequence that is denoted as {F[j]; j is an integer index}. Specifically, as an example, buffers 101-104 are shown storing respectively F[n+2], F[n+1], F[n] and F[n−1] in the current operation cycle. As understood herein, at the next operating cycle of system 100, buffers 101-104 will store respectively F[n+3], F[n+2], F[n+1], and F[n].

Interpolation unit 120 is adapted to receive F[n+2], F[n+1], F[n] and F[n−1], i.e., the content stored respectively in buffers 101-104. Having received F[n+2], F[n+1], F[n] and F[n−1], interpolation unit 120 is adapted to generate therefrom a reference field F'[n] using intra-field interpolation and/or inter-field interpolation. In turn, F'[n] is adapted to be transferred to adaptive de-interlacing unit 140 to facilitate interpolation of F[n].

Multiplexer 130 is adapted to receive F[n+1] and F[n−1]. Having received F[n+1] and F[n], multiplexer 130 is adapted to generate therefrom a multiplexed signal (denoted as F[n+1]/F[n−1]) to be transferred to adaptive de-interlacing unit 140.

Upon receiving both F[n] and F[n+1]/F[n−1], motion object VOF detection unit 150 is adapted to assess the likelihood of having a video on film object edge through a current processing pixel along one of n pre-defined directions intercepting at the current processing pixel.

Moreover, for the current processing pixel, unit 150 is adapted to generate k, a number having a value anywhere from zero to one. Generated using fuzzy logic inference rules, the number k is adapted to quantify the assessed likelihood of having a video on film object edge through the current processing pixel. The number k is intended as a weighting factor that specifies a weighted sum of different de-interlacing techniques. Specifically, the weighting factor k specifies (for the current processing pixel) a weighted sum of de-interlacing via interpolation operation and de-interlacing via merging operation, i.e., (k) (a pixel value assigned to the current processing pixel by interpolation de-interlacing)+(1−k) (a pixel value assigned to the current processing pixel by merging de-interlacing).

As understood hereinafter, 'interpolation de-interlacing' refers to performing de-interlacing at a current processing pixel by using interpolation operation (typically used in de-interlacing non-film source fields) to assign a pixel value to the pixel. On the other hand, 'merging de-interlacing' refers to performing de-interlacing at a current processing pixel by using merging operation (typically used in de-interlacing film source fields) to assign a pixel value to the pixel. Moreover, the weighting factor k is generated using fuzzy logic by motion object VOF detection unit 150.

Adaptive de-interlacing unit 140 is adapted to perform de-interlacing. Unit 140 is characterized as 'adaptive' because it allows de-interlacing to be performed according to the assessed likelihood of having video on film mixed with film source fields. Adaptive de-interlacing unit 140 receives this assessment in the form of the weighting factor k.

Specifically, adaptive de-interlacing unit 140 receives F'[n], F[n] and F[n+1]/F[n−1]. Adaptive de-interlacing unit 140 is also adapted to receive the weighting factor k from motion object VOF detection unit 150. In turn, adaptive de-interlacing unit 140 performs de-interlacing by assigning a pixel value to a current processing pixel of a progressive frame output according to the mixture (weighted sum) as specified by the weighting factor k.

As understood hereinafter, a pixel value can refer to a gray-level value, a luminance value, a chrominance value, a composite signal value, or a combination of any channel of any image representation.

Referring now to FIG. 2 in view of FIG. 1, motion object VOF detection unit 150 is shown in more detail in accordance with one embodiment of the invention.

VOF motion object direction unit 150 has inputs coupled to buffer 103 and multiplexer 130. Motion object VOF detection unit 150 comprises VOF motion object direction generator 210 and fuzzy logic processing unit 220. VOF motion object direction generator unit 210 is coupled to fuzzy logic processing unit 220.

VOF motion object direction unit 210 is adapted to assess the likelihood of having a video on film object edge along any of n pre-defined directions that intercept approximately at the current processing pixel. In turn, VOF motion object direction unit 210 is adapted to select from the n pre-defined directions the most likely direction to have a video on film object edge going through the current processing pixel. Unit 210 uses classical logic inference rules to analyze these n sets of reference quantities in order to arrive at the selection. (Details of these sets of reference quantities will be described with respect to FIGS. 4A-C.)

Specifically, unit 210 generates n sets of reference quantities that are associated respectively to the n pre-defined directions. An example of a reference quantity is the pixel value difference between two inter-field pixels that are neighboring the current processing pixel and lying along a pre-defined direction through the current processing pixel. Another example of a reference quantity is the pixel value difference between the current processing pixel and its intra-field neighbor pixel. Yet another example of a reference quantity is the pixel value difference between two intra-field neighboring pixels of the current processing pixel lying along a pre-defined direction through the current processing pixel.

By applying classical logic to these sets of reference quantities, unit 210 generates two more reference quantities R[1] and R[2] to be provided to fuzzy logic processing unit 220. R[1] and R[2] are generated with respect to the selected pre-defined direction through the current processing pixel. Specifically, R[1] is an intra-field reference quantity that quantifies the maximum dissimilarity between a pair of intra-field pixels of the current processing pixel lying along the selected direction. R[1] is the maximum among u intra-field pixel value differences that are obtained from u pairs of pixels comprising intra-field neighboring pixels of the current processing pixel lying along the selected direction. On the other hand, R[2] is an inter-field reference quantity that quantifies the minimum similarity between a pair of inter-field pixels of the current processing pixel lying along the selected direction. R[2] is the minimum among v inter-field pixel value differences that are obtained from v pairs of pixels comprising inter-field neighboring pixels of the current processing pixel lying along the selected direction. (Details of classical logic inference rules will be described with respect to FIG. 5.)

Fuzzy logic processing unit 220 is adapted to analyze R[1] and R[2] using fuzzy logic inference rules in order to determine a weighting factor k. In turn, the weighting factor k is provided to adaptive de-interlacing unit 140 for de-interlacing at the current processing pixel. (Details of fuzzy logic inference rules will be described with respect to FIG. 5.)

Referring now to FIG. 3, an example of video on film motion object edge is shown to have an edge degradation resulting from incorrectly applying the de-interlacing technique of merging to a video on film object edge.

Specifically, a film source de-interlaced progressive frame output 300 is shown containing a 'picture in picture' portion 310. Progressive frame output 300 has resulted from de-interlacing via merging operation. On the other hand, the image object 320 within in portion 310 is shown to have uneven edge that resulted from de-interlacing portion 310 using merge mode de-interlacing as the rest of progressive frame output 300. This effect of jagged edge highlights the fact that picture in picture portion 310 originated from non-film source.

FIGS. 4A-C are introduced in view of FIG. 3. Each of FIGS. 4A-C depicts a scenario of picture in picture portion 310 with respect to a current processing pixel x located at (L[n], m) of progressive output frame 300. Also, three sets of reference quantities adapted for assessing the likelihood of having a video on film object edge are described respectively for FIGS. 4A-C.

Referring now to FIG. 4A, a scenario of picture in picture portion 310 is shown in accordance with one embodiment of the invention. Specifically, FIG. 4A is associated with a video on film object edge (through pixel x) along a direction D[1] within picture in picture portion 310. Also, a list is shown comprising various reference quantities associated with the scenario.

Specifically, the first set S[1] of reference quantities comprises intra-field quantities (Intra[1,1], Intra[1,2] and Intra [1,3]) and inter-field quantities (Inter[1,1], Inter[1,2]) that are generated in association with edge direction D[1] through pixel x located at (L[n], m) of progressive frame output 300. More specifically, Intra[1,1]=|P(L[n+1], m)−P(L[n−1], m)|;

Intra[1,2]=|P(L[n+1], m)−P(L[n+3], m)|; and

Intra[1,3]=|P(L[n], m)−P(L[n+2], m)|.

Sum[1]=Intra[1,1]+Intra[1,2]+Intra[1,3].

Inter[1,1]=|P(L[n], m)−P(L[n−1], m)|; and

Inter[1,2]=|P(L[n], m)−P(L[n+1], m)|.

(As understood hereinafter, P denotes a function adapted to assign a pixel value to each pixel as specified by the field containing the pixel.)

Reference quantities of S[1] are adapted to be used for assessing the likelihood of having an object edge in direction D[1]. If these quantities match certain conditions to be described below with respect to FIG. 5, then an object edge is considered to have direction D[1]. For example, if a video on film object edge lies along D[1] as shown in FIG. 4A, then Intra's are negligible while Inter's are not negligible. On the other hand, if no video on film object edge lies along D[1], then these relationships are not likely to be satisfied.

Each of Intra[1,1], Intra[1,2] and Intra[1,3] is a pixel value difference between two pixels belonging to the same field. In turn, if a pixel value difference is approximately zero (negligible), then the two pixel values being compared are approximately equal. Thus, if a video on film object edge is present, then these three reference quantities are likely to be approximately zero. Moreover, if a video on film object edge is present, then their sum Sum[1] is also likely to approximately zero. As such, Sum[1] can be used to assess the likelihood of having a video on film object edge with direction D[1].

Each of Inter[1,1], Inter[1,2] is a pixel value difference between two pixels belong respectively to two different fields. If a video on film object edge is present along D[1], then a pixel value difference (such as Inter[1,1] and Inter [1,2]) is "large" (i.e., not negligible). As such, magnitude of Inter[1,1] and Inter[1,1] can be used to assess the likelihood of having a video on film object edge with direction D[1].

Referring now to FIG. 4B, a scenario of picture in picture portion 310 is shown in accordance with one embodiment of the invention. Specifically, FIG. 4B is associated with a video on film object edge (through pixel x) along a direction D[2] within picture in picture portion 310. Also, a list is shown comprising various reference quantities associated with the scenario.

Specifically, the second set S[2] of reference quantities comprises intra-field quantities (Intra[2,1], Intra[2,2] and Intra [2,3]) and inter-field quantities (Inter[2,1], Inter[2,2]) that are generated in association with edge direction D[2] through pixel x located at (L[n],m) of progressive frame output 300. More specifically, Intra[2,1]=|P(L[n+1], m−1)−P(L[n−1], m+1)|;

Intra[2,2]=|P(L[n+1], m−1)−P(L[n+3], m−3)|; and

Intra[2,3]=|P(L[n], m)−P(L[n+2], m−2)|.

Sum[2]=Intra[2,1]+Intra[2,2]+Intra[2,3].

Inter[2,1]=|P(L[n], m)−P(L[n−1], m+1)|; and

Inter[2,2]=|P(L[n], m)−P(L[n+1], m−1)|.

Reference quantities of S[2] are adapted to be used for assessing the likelihood of having an object edge with direction D[2]. If these quantities match certain conditions to be described below with respect to FIG. 5, then an object edge is considered to have direction D[2]. For example, if a video on film object edge lies along D[2] as shown in FIG. 4B, then Intra's are negligible while Inter's are not negligible. On the other hand, if no video on film object edge lies along D[2], then these relationships are not likely to be satisfied.

Each of Intra[2,1], Intra[2,2] and Intra[2,3] is a pixel value difference between two pixels belonging to the same field. In turn, if a pixel value difference is approximately zero (negligible), then the two pixel values being compared are approximately equal. Thus, if a video on film object edge is present, then these three reference quantities are likely to be approximately zero. Moreover, if a video on film object edge is present, then their sum Sum[2] is also likely to be approximately zero. As such, Sum[2] can be used to assess the likelihood of having a video on film object edge with direction D[2].

Each of Inter[2,1], Inter[2,2] is a pixel value difference between two pixels belong respectively to two different fields. If a video on film object edge is present along D[2], then a pixel value difference (such as Inter[2,1] and Inter [2,2]) is "large" (i.e., not negligible). As such, magnitude of Inter[2,1] and Inter[2,1] can be used to assess the likelihood of having a video on film object edge with direction D[2].

Referring now to FIG. 4C, a scenario of picture in picture portion 310 is shown in accordance with one embodiment of the invention. Specifically, FIG. 4C is associated with a video on film object edge (through pixel x) along a direction D[3] within picture in picture portion 310. Also, a list is shown comprising various quantities associated with the scenario.

Specifically, the third set S[3] of reference quantities comprises intra-field quantities (Intra[3,1], Intra[3,2] and Intra [3,3]) and inter-field quantities (Inter[3,1], Inter[3,2]) are generated in association with edge direction D[3]. More specifically, Intra[3,1]=|P(L[n+1], m+1)−P(L[n−1], m−1)|;

Intra[3,2]=|P(L[n+1], m+1)−P(L[n+3], m+3)|; and

Intra[3,3]=|P(L[n], m)−P(L[n+2], m+2)|.

Sum[3]=Intra[3,1]+Intra[3,2]+Intra[3,3].

Inter[3,1]=|P(L[n], m)−P(L[n−1], m−1)|; and

Inter[3,2]=|P(L[n], m)−P(L[n+1], m+1)|.

Reference quantities of S[3] are adapted to be used for assessing the likelihood of having an object edge with direction D[3]. If these quantities match certain conditions to be described below with respect to FIG. 5, then an object edge is considered to have direction D[3]. For example, if a video on film object edge lies along D[3] as shown in FIG. 4C, then Intra's are negligible while Inter's are not negligible. On the other hand, if no video on film object edge lies along D[3], then these relationships are not likely to be satisfied.

Each of Intra[3,1], Intra[3,2] and Intra[3,3] is a pixel value difference between two pixels belonging to the same field. In turn, if a pixel value difference is approximately zero (negligible), then the two pixel values being compared are approximately equal. Thus, if a video on film object edge is present, then these three reference quantities are likely to be approximately zero. Moreover, if a video on film object edge is present, then their sum Sum[3] is also likely to be approximately zero. As such, Sum[3] can be used to gauge the likelihood of having a video on film object edge with direction D[3].

Each of Inter[3,1], Inter[3,2] is a pixel value difference between two pixels belong respectively to two different fields. If a video on film object edge is present along D[3], then a pixel value difference (such as Inter[3,1] and Inter [3,2]) is "large" (i.e., not negligible). As such, magnitude of Inter[3,1] and Inter[3,1] can be used to gauge the likelihood of having a video on film object edge with direction D[3].

As understood herein, the imprecise idea of a reference quantity being negligible (i.e., small) or being non-negligible (i.e., large) is well handled by fuzzy logic. Consequently, fuzzy logic is used to assess if these reference quantities are small or large. Moreover, fuzzy logic set memberships for fuzzy sets Small and Large can be adjusted to suit particular applications.

Referring now to FIG. 5 in view of reference quantities of FIGS. 4A-C, a combination of crisp (i.e., classical) logic and fuzzy logic inference rules used in one embodiment of the invention is summarized.

Specifically, a group of crisp logic rules 510 as applied to S[1], S[2] and S[3] for de-interlacing motion object video on film is summarized in accordance with the present embodiment. Also, a group of fuzzy logic interference rules 520 as applied to de-interlacing motion object video on film is summarized in accordance with the present embodiment. Rules 510 are adapted to determine which of three pre-defined directions (D[1], D[2] and D[3]) going through a current processing pixel x is most likely to have a video on film object edge. Once this determination is made, rules 510 is also adapted to provide two reference quantities R[1] and R[2] that will be relied upon by fuzzy logic inference rules 520 to specify a mixture of different de-interlacing techniques for assigning a pixel value to the current processing pixel x (located at (L[n], m) of progressive frame output 300).

The purposes of crisp logic rules 510 are at least two-fold: a) to determine a likely direction D[j] (out of D[1], D[2] and D[3]) to have a video on film object edge, and b) to generate R[1] and R[2] associated with the likely direction D[j] once that determination is made. R[1] quantifies the maximum dissimilarity between a pair of intra-field pixels of x. R[2] quantifies the minimum similarity between a pair of inter-field pixels of x.

Specifically, crisp logic rules 510 are:
If
Sum[1] is the minimum element of {Sum[1], Sum[2], Sum[3]},
Then
Let R[1]=maximum element of {Intra[1,1], Intra[1,2], Intra[1,3]}, and
Let R[2]=minimum element of {Inter[1,1], Inter[1,2]}.
Otherwise,
If
Sum[2] is the minimum element of {Sum[1], Sum[2], Sum[3]},
Then
Let R[1]=maximum element of {Intra[2,1], Intra[2,2], Intra[2,3]}, and
Let R[2]=minimum element of {Inter[2,1], Inter[2,2]}.
Otherwise,
If
Sum[3] is the minimum element of {Sum[1], Sum[2], Sum[3]},
Then
Let R[1]=maximum element of {Intra[3,1], Intra[3,2], Intra[3,3]}, and
Let R[2]=minimum element of {Inter[3,1], Inter[3,2]}.

If a video on film object edge is present along D[1], then R[1], now as the maximum of {Intra[1,1], Intra[1,2], Intra [1,3]}, is still small. Also, if a video on film object edge is present along D[1], then R[2], minimum element of {Inter [3,1], Inter[3,2]}, is still large.

Similarly, if a video on film object edge is present along D[2], then R[1], now as the maximum of {Intra[2,1], Intra [2,2], Intra[2,3]}, is still small. Also, if a video on film object edge is present along D[2], then R[2], minimum element of {Inter[3,1], Inter[3,2]}, is still large.

Similarly, if a video on film object edge is present along D[3], then R[1], now as the maximum of {Intra[3,1], Intra [3,2], Intra[3,3]}, is still small. Also, if a video on film object edge is present along D[3], then R[2], minimum element of {Inter[3,1], Inter[3,2]}, is still large.

However, imprecise concepts such as small and large are not well defined by classical logic. Thus, fuzzy logic is used to handle the concepts of small and large by using fizzy sets of Small and Large.

Referring still to FIG. 5, from R[1] and R[2], fuzzy logic inference rules 520 are adapted to generate a weighting factor denoted as k. Weighing factor k assesses the likelihood of having a video on film object edge through x along the selected likely direction. Weighting factor k is adapted to specify a weighted sum of different de-interlacing techniques.

Specifically, these fuzzy logic inference rules 520 are:
If
R[1] is Small and R[2] is Large,
Then
k is Large.
Otherwise,
If
R[1] is not Small or R[2] is not Large,
Then
k is Small.

In other words, if R[1] is within the required range and if R[2] is also within the required range, then the likelihood of having a video on film object edge is considered high. In turn, for de-interlacing at the current processing pixel x, interpolation mode de-interlacing is emphasized over merge mode de-interlacing. Otherwise, if either R[1] or R[2] is not within the required range, then the likelihood of having a video on film object edge is not considered high. In turn, for de-interlacing at the current processing pixel x, interpolation mode de-interlacing is not as emphasized over merge mode de-interlacing.

As understood herein, Small and Large above refer to fuzzy logic sets. Moreover, fuzzy logic sets such as Small and Large can be chosen to fit the application requirements at hands.

Once the weighting factor k is obtained through these fuzzy logic rules 520, the pixel value of pixel x located at (L[n], m) for progressive frame output 300 is:

$$P''=([L[n],m])=kP'(L[n-1], L[n+1])+(1-k)P(L[n], m).$$

Function P" assigns to a pixel its pixel value for the progressive display output. Function P'(L[n−1],m)=f(F[n−1], F[n], F[n+1], F[n+2]) represents the pixel value resulting from interpolation. This interpolated pixel value in turn is obtained from intra-field interpolation and inter-field interpolation using pixel values from L[n−1] and L[n+1] of fields F[n−1], F[n], F[n+1] and F[n+2]. Function P, as before, assigns pixel value to a pixel as indicated by the field containing the pixel.

As understood herein, the present invention is not limited to three pre-defined directions at a processing pixel such as (L[n],m). For example, in another embodiment of the invention, more than three directions are pre-defined so that edge detection about pixel (L[n],m) is performed along more than three pre-defined directions. In this embodiment, additional sets of reference quantities are generated for the additional pre-defined directions. In so doing, R[1] and R[2] are generated for the likely direction (out of all pre-defined directions) at a current processing pixel to have a video on film object edge. Then, fuzzy logic inference rules are applied to R[1] and R[2] to generate a weighting factor k for characterizing a weighted sum of different de-interlacing techniques.

Referring now to FIG. 6 in view of FIGS. 4A-C and FIG. 5, a flow chart 600 is shown outlining steps performed for de-interlacing in accordance with one embodiment of the invention. The de-interlacing is performed on film source fields that might be mixed with video on film object edges.

To assign a pixel value to a current processing pixel for the progressive frame output image, pixel values from fields are compared.

In step 610, reference quantities are generated for characterizing image region around the current processing pixel to be assigned a pixel value. Specifically, three sets of reference quantities S[1], S[2] and S[3] are generated with respect to three pre-defined directions D[1], D[2] and D[3]. For h=1 to 3, S[h] comprises three intra-field pixel value differences Intra[h,1], Intra[h,2] and Intra[h,3], as well as two inter-field pixel value differences Inter[h,1] and Inter[h,2]. For h=1 to 3, S[h] also comprises Q[h], which is the sum of Intra[h,1], Intra[h,2] and Intra[h,3].

In step 615, analysis is performed around the current processing pixel along the three pre-defined directions D[1], D[2] and D[3] for selecting video on film object edge's direction based on the generated reference quantities. This analysis determines out of the three directions the direction likely to have an video on film object edge going through the current processing pixel. Specifically, as determined by crisp logic rules 510, the selected 'likely' direction D[j] (where j can be 1, 2 or 3) has its associated Sum[j] as the minimum of Sum[1], Sum[2] and Sum[3].

In step 620, two quantities R[1] and R[2] are assigned to the selected direction D[j].

Fuzzy logic inference rules 520 are applied to R[1] and R[2] in order to assess the likelihood of having film source field mixed with a video on film object edge approximately at the current processing pixel. Specifically, R[1] is related to intra-field quantities by being defined as the maximum of Intra[j,1], Intra[j,2] and Intra[j,3]. On the other hand, R[2] is related to inter-field quantities by being defined as the minimum of Inter[j,1] and Inter[j,2]. If R[1] is within the required range and if R[2] is also within the required range, then the likelihood of having a video on film object edge is considered high. Thus, for de-interlacing, more emphasis is placed on interpolation mode de-interlacing. Otherwise, a different emphasis is placed on interpolation mode de-interlacing.

Specifically, in step 625, a weighting factor k is generated using fuzzy logic inference algorithm in accordance with fuzzy logic rules 520. According to rules 520, if R[1] and R[2] satisfy the stated conditions (fuzzy logic premise), then interpolation mode de-interlacing is emphasized more over merging mode de-interlacing. Otherwise, if the relationship between R[1] and R[2] does not satisfy the stated condition (fuzzy logic premise), then merging mode de-interlacing is emphasized more over interpolation mode de-interlacing. Using fuzzy logic algorithm, defuzzification is performed to generate k.

In step 630, de-interlacing using a weighted sum is performed to obtain the pixel value to be assigned to the current processing pixel at (L[n],m) of the progressive frame output. The weighted sum is (k)(a pixel value assigned to the current processing pixel by interpolation de-interlacing)+(1−k) (a pixel value assigned to the current processing pixel by merging de-interlacing).

This weighted sum can also be expressed as:

$$P''(L[n],m)=k*P'(L[n-1], L[n+1])+(1-k)*P(L[n],m).$$

Again, P'(L[n−1], L[n+1]) refers to interpolated pixel value, while P(L[n],m) refers to field assigned pixel value.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method comprising:
   using fuzzy logic to determine the ability of multiple de-interlacing operations to de-interlace image field data; and
   de-interlacing the image field data according to the fuzzy logic determination.

2. The method of claim 1 where the de-interlacing comprises
   de-interlacing the image field data according to the multiple de-interlacing operations; and
   blending the de-interlaced image field data from the multiple de-interlacing operations according to the fuzzy logic determination.

3. The method of claim 2 comprising
   determining a coefficient according to at least one fuzzy logic inference rule; and
   blending the de-interlaced image field data from the multiple de-interlacing operations according to the coefficient.

4. The method of claim 3 where the coefficient is determined according to classical logic rules and fuzzy logic inference rules.

5. The method of claim 1 where at least one of the de-interlacing operations is an interpolation operation or a merging operation.

6. The method of claim 5 where the interpolation operation is an intra-field interpolation, an inter-field interpolation, or both the intra-field interpolation and the inter-field interpolation.

7. The method of claim 1
   where the image field data is a pixel within an image field; and
   using fuzzy logic to identify an image transition through the pixel.

8. The method of claim 7 where the direction of the image transition through the pixel corresponds to adjacent intra-field pixels.

9. The method of claim 7 where the image transition corresponds to an edge of a picture-in-picture application.

10. An apparatus including a computer-readable medium containing computer instructions that, when executed, cause a processor or multiple communicating processors to perform a method comprising:
    using fuzzy logic to determine the ability of multiple de-interlacing operations to de-interlace image field data; and
    de-interlacing the image field data according to the fuzzy logic determination.

11. The apparatus of claim 10 where the method comprises
    de-interlacing the image field data according to the multiple de-interlacing operations; and
    blending the de-interlaced image field data from the multiple de-interlacing operations according to the fuzzy logic determination.

12. The apparatus of claim 11 where the method comprises
    determining a coefficient according to at least one fuzzy logic inference rule; and
    blending the de-interlaced image field data from the multiple de-interlacing operations according to the coefficient.

13. The apparatus of claim 12 where the coefficient is determined according to classical logic rules and fuzzy logic inference rules.

14. The apparatus of claim 10 where at least one of the de-interlacing operations is an interpolation operation or a merging operation.

15. The apparatus of claim 14 where the interpolation operation is an intra-field interpolation, an inter-field interpolation, or both the intra-field interpolation and the inter-field interpolation.

16. The apparatus of claim 10
    where the image field data is a pixel within an image field; and
    using fuzzy logic to identify an image transition through the pixel.

17. The apparatus of claim 16 where the direction of the image transition through the pixel corresponds to adjacent intra-field pixels.

18. The apparatus of claim 16 where the image transition corresponds to an edge of a picture-in-picture application.

19. A system comprising:
    a fuzzy logic unit to determine the ability of multiple de-interlacing operations to de-interlace image field data using fuzzy logic; and
    a selection unit to de-interlace the image field data according to the fuzzy logic determination.

20. The system of claim 19 where the selection unit comprises
    a plurality of de-interlacing units to perform de-interlacing operations on image field data; and
    an adaptive de-interlacer to blend the image field data from the de-interlacing units according to the fuzzy logic determination.

21. The system of claim 20
    where the fuzzy logic unit is operable to determine a coefficient; and
    where the adaptive de-interlacer is operable to blend the image field data from the de-interlacing units according to the coefficient.

22. The system of claim 20 where the plurality of de-interlacing units include an interpolator to perform an interpolation de-interlacing operation on the image field data.

23. The system of claim 20 where the plurality of de-interlacing units include a merger to perform a merging de-interlacing operation on the image field data.

24. The system of claim 19
    where the image field data is a pixel within an image field; and
    where the fuzzy logic unit is operable to identify an image transition through the pixel.

25. The system of claim 24 where the direction of the image transition through the pixel corresponds to adjacent intra-field pixels.

26. The system of claim 24 where the image transition corresponds to an edge of a picture-in-picture application.

27. A system comprising:
    means for determining the ability of multiple de-interlacing operations to de-interlace image field data using fuzzy logic; and
    means for de-interlacing the image field data according to the fuzzy logic determination.

28. The system of claim 27 comprising
    means for performing the de-interlacing operations on the image field data; and
    means for blending the de-interlaced image field data according to the fuzzy logic determination.

29. The system of claim 27
    means for determining a coefficient; and
    means for blending the image field data according to the coefficient.

* * * * *